US009920571B2

(12) United States Patent
Smith et al.

(10) Patent No.: US 9,920,571 B2
(45) Date of Patent: Mar. 20, 2018

(54) INTEGRATED CONTROLLER FOR CLOSURE OPERATOR UNIT

(71) Applicant: Automatic Technology (Australia) Pty Ltd, Keysborough (AU)

(72) Inventors: Travis William Smith, Box Hill (AU); Geoff Baker, Geelong (AU); Nikolai Klepikov, Carnegie (AU); Jasbir Singh, Taylors Hill (AU); Ray Hawkins, Frankston (AU)

(73) Assignee: Automatic Technology (Australia) Pty. Ltd. (AU)

( * ) Notice: Subject to any disclaimer, the term of this patent is extended or adjusted under 35 U.S.C. 154(b) by 0 days.

(21) Appl. No.: 15/176,466

(22) Filed: Jun. 8, 2016

(65) Prior Publication Data

US 2016/0281422 A1    Sep. 29, 2016

Related U.S. Application Data

(63) Continuation of application No. 13/813,233, filed as application No. PCT/AU2011/000965 on Aug. 1, 2011, now abandoned.

(51) Int. Cl.
*G01R 31/02*    (2006.01)
*G05B 5/00*    (2006.01)
(Continued)

(52) U.S. Cl.
CPC ............... *E06B 9/70* (2013.01); *F16P 3/00* (2013.01); *H02K 5/10* (2013.01); *H02K 5/18* (2013.01);
(Continued)

(58) Field of Classification Search
USPC .......................................................... 318/490
See application file for complete search history.

(56) References Cited

U.S. PATENT DOCUMENTS 5,331,239 A    7/1994 Kwun et al.
5,625,266 A *  4/1997 Stark .................. G05B 19/0428
                                    187/316
(Continued)

FOREIGN PATENT DOCUMENTS

WO    2012012848    2/2012

OTHER PUBLICATIONS

Smith, Travis William; Final Office Action for U.S. Appl. No. 13/813,233, filed Feb. 22, 2014, dated Nov. 4, 2015, 21 pgs.
(Continued)

*Primary Examiner* — Bentsu Ro
*Assistant Examiner* — Zemenay Truneh
(74) *Attorney, Agent, or Firm* — Taylor English Duma LLP

(57) ABSTRACT

An integrated controller for an operator unit for powering an overhead garage roller door or roller shutter is described. The operator unit comprises a motor, an output drive assembly, a timing assembly unit, and a clutch assembly for providing selective engagement between motor powered operation and manual operation (provided by a chain rotating a chain wheel). The motor is arranged to drive a shaft which, in turn, provides drive to the roller door or shutter assembly (not shown), which includes an axle around which the roller door or shutter is wound. The integrated controller comprises an inverter for receiving a single phase power supply and supplying three phase power to drive the motor; and a drive controller in operable association with the inverter for providing active management of the operation of the motor.

34 Claims, 13 Drawing Sheets

(51) Int. Cl.

| | |
|---|---|
| *E06B 9/70* | (2006.01) |
| *H02P 31/00* | (2006.01) |
| *F16P 3/00* | (2006.01) |
| *H02K 11/33* | (2016.01) |
| *H02K 5/10* | (2006.01) |
| *H02K 5/18* | (2006.01) |
| *H02K 5/22* | (2006.01) |
| *H02K 7/10* | (2006.01) |
| *H02K 7/108* | (2006.01) |
| *H02K 9/04* | (2006.01) |
| *H02P 29/024* | (2016.01) |
| *H02P 5/68* | (2006.01) |
| *H02P 1/30* | (2006.01) |

(52) U.S. Cl.
CPC ............. *H02K 5/22* (2013.01); *H02K 7/1004* (2013.01); *H02K 7/1085* (2013.01); *H02K 9/04* (2013.01); *H02K 11/33* (2016.01); *H02P 29/024* (2013.01); *H02P 29/0241* (2016.02); *H02P 31/00* (2013.01); *E05Y 2201/434* (2013.01); *E05Y 2900/106* (2013.01); *H02P 1/30* (2013.01); *H02P 5/68* (2013.01)

(56) References Cited

U.S. PATENT DOCUMENTS

| | | | | |
|---|---|---|---|---|
| 5,950,752 | A * | 9/1999 | Lyons | B60H 1/004 165/41 |
| 6,545,438 | B1 * | 4/2003 | Mays, II | H02P 6/08 318/400.01 |
| 6,657,409 | B1 * | 12/2003 | Leivenzon | E06B 9/80 318/286 |
| 2003/0030404 | A1 * | 2/2003 | Iwaji | H02P 23/30 318/700 |
| 2003/0076062 | A1 * | 4/2003 | Mullet | G05B 19/042 318/445 |
| 2003/0117093 | A1 | 6/2003 | Makaran et al. | |
| 2005/0102903 | A1 * | 5/2005 | Takahashi | B61D 19/02 49/28 |
| 2010/0117578 | A1 * | 5/2010 | Hollenbeck | H02P 1/30 318/461 |

OTHER PUBLICATIONS

Smith, Travis William; Non-Final Office Action for U.S. Appl. No. 13/813,233, filed Feb. 22, 2013, dated Mar. 25, 2015, 22 pgs.

Smith, Travis William; Notice of Allowance for U.S. Appl. No. 13/813,233, filed Feb. 22, 2013, dated Mar. 31, 2016, 10 pgs.

Smith, Travis; U.S. Patent Application entitled: Integrated Controller for Closure Operator Unit, having U.S. Appl. No. 13/813,233, filed Jan. 30, 2013, 36 pgs.

Smith; International Preliminary Report on Patentability for serial no. PCT/AU2011/000965, filed on Aug. 1, 2011, dated Aug. 23, 2012, 16 pgs.

Smith; International Search Report for serial no. PCT/AU2011/000965, filed on Aug. 1, 2011, dated Oct. 25, 2011, 5 pgs.

\* cited by examiner

4 MOTOR
7 TIMING ASSEMBLY UNIT
8 CLUTCH ASSEMBLY
16 INTEGRATED CONTROLLER
18 INVERTER
24 DRIVE CONTROLLER
28 MICRO-CONTROLLER
30 INVERTER DRIVER
32 FILTER MODULE
34 USER CONTROL UNIT
36 POWER RECEIVING MODULE
38 MAINS SUPPLY

INTEGRATED CONTROLLER FOR CLOSURE OPERATOR UNIT

CROSS-REFERENCE TO RELATED APPLICATIONS

This application is a continuation of U.S. application Ser. No. 13/813,233, filed Feb. 22, 2013, and entitled "INTEGRATED CONTROLLER FOR CLOSURE OPERATOR UNIT," which is a National Stage Entry of PCT Application No. PCT/AU11/00965, filed Aug. 1, 2011, which claims priority to Australian Patent Application No. 2010903422, filed Jul. 30, 2010, the entirety of each of which are hereby incorporated herein by this reference.

FIELD OF THE INVENTION

The present invention relates to an integrated controller for an operator unit for driving a closure. In one aspect, the invention relates to an integrated controller for an operator unit having a motor for driving a closure such as an overhead garage door.

BACKGROUND OF THE INVENTION

In this specification, where a document, act or item of knowledge is referred to or discussed, this reference or discussion is not an admission that the document, act or item of knowledge or any combination thereof was at the priority date:
(i) part of common general knowledge; or
(ii) known to be relevant to an attempt to solve any problem with which this specification is concerned.

Power-driven closures—such as roller doors, shutters, gates and the like—are very widely used for controlling access to buildings and other areas, such as garages, driveways, warehouses, factories, etc. Such closures are typically driven by an electric drive operator unit positioned to one side of the closure. For an overhead roller door or roller shutter, the output drive shaft of the operator unit is arranged to rotate a drum or similar assembly arranged to rotate about an axle, around which the door is wound and unwound, and the operator unit is mounted at or adjacent to one end of the axle.

Such operator units, particularly those for relatively heavy-duty applications such as industrial doors, gates or shutters, commonly include three-phase electric motor units for driving the closure. Such units therefore require the provision of a three phase power source and a suitable controller for controlling the operation of the motor via the three phase supply.

In such applications, prior art controller and power source arrangements have generally proven to be relatively complex and somewhat inconvenient. Installation needs to be completed by qualified electricians. Further, such arrangements generally provide limited ability for restoring operation in the event a fault occurs. In such instances, the services of a qualified electrician are once again usually required, to perform the appropriate diagnostic tests to determine the nature of the fault and restore the controller operation. Such an exercise effectively removes the operator unit from service until the repair is complete, which is costly and inconvenient.

Accordingly, although controller and power supply arrangements for such operator units are known, there is a need for an improved solution.

SUMMARY OF THE INVENTION

According to a first aspect of the present invention, there is provided an integrated controller for an operator unit having a three phase motor for driving a closure, the controller comprising:
an inverter for receiving a single phase power supply and supplying three phase power to drive the motor; and,
a drive controller in operable association with the inverter for providing active management of the operation of the motor.

The drive controller and the inverter are thus arranged to function in an integral manner, thereby providing improved management and control over operation of the motor.

Preferably, the inverter and the drive controller are provided within a common controller housing. The controller housing is preferably mounted directly to a housing of the motor. In one form, the controller housing cannot be removed from the motor housing without interrupting the power supply to the integrated controller.

Preferably, the inverter includes an inverter micro-controller programmed to manage operation of the inverter, operably interconnected with an inverter driver to generate the required three-phase waveforms for supply to the motor, whereby the inverter micro-controller is arranged to receive input signals relating to the operation and performance of the inverter driver, and to communicate this information to the drive controller. This information may include temperature, current level or voltage level.

The inverter micro-controller may be arranged to receive one or more input signals relating to the operation and performance of the inverter, such as temperature, current, or voltage levels, and to provide such information to the controller.

In a preferred form, the inverter driver is arranged to supply the three phase power to the motor at a frequency controllable between 0 and 120 Hz.

Preferably, the integrated controller includes an electrical power supply module arranged to supply power to both the drive controller and the inverter driver.

The inverter and the drive controller may be controlled by a single integrated micro-controller.

A first communication link between the drive controller and inverter may be provided to allow first signal information to be sent to the inverter from the drive controller, the first signal information comprising operation instructions for operation of the motor (such as speed and direction instructions).

A second communication link between the controller and inverter may be provided to allow second signal information to be sent from the inverter to the drive controller, the second signal information comprising status information relating to the performance of the inverter. The inverter status may thus be monitored by the controller.

The controller may be configured to store a history of events relating to the operation of the unit. Such events may include open/close cycles of the closure and any faults that occur during operation.

In the event that the inverter should develop a fault, the status information can provide diagnostic information relating to the status of the inverter at the time the fault occurred (the time noted and stored by way of a time stamp function). The diagnostic information may therefore be used to further provide active performance management of the operation of the inverter. The status information may include, the following operational parameters:

the level of supply voltage at the time fault occurred;
the level of current at the time fault occurred;
the motor drive current limit;
the motor drive current level;
Insulated Gate Bipolar Transistor (IGBT) driver temperature at fault;
IGBT driver fault.

A third communications link between the controller and the inverter may be provided to allow third signal information to be sent to the inverter from the controller, the third signal information may comprise override instructions. This allows the controller to override existing operational commands previously sent to the inverter, for situations in which, for example a fault has occurred. In such cases, the controller may provide override instructions directly to the inverter driver to cease operation of the motor.

The controller may be arranged by way of the third communications link to instruct the inverter to cease operation in the event that one of the first and second communication links is lost.

The communication between the controller and inverter may be arranged so that, in the event of a fault and the motor operation ceasing, operation of the inverter can be recovered without the need to terminate operation of the controller. When a fault occurs, the controller may be configured to provide information to an operator who can then selectively reset the operation of the unit.

A further communications link may be provided between a position sensor and the controller. The position sensor is arranged to monitor movement of an output of the operator unit, such as rotation of the driven shaft, so to continually provide information regarding the position of the closure. The controller is thus able to continuously monitor the position, speed and direction of the closure throughout its movement cycle between open and closed positions.

The transfer of signal information from the position sensor is coordinated by the controller.

A further communications link may be established between a clutch assembly (for selectively engaging drive between an auxiliary drive and the closure) and the controller, for signalling whether or not an auxiliary drive has been selectively engaged to drive the closure. The clutch assembly may include a switch arranged to detect when an attempt is made to engage the auxiliary drive to drive the closure, and accordingly to provide an appropriate signal to the controller. When such a signal is received, the controller ceases operation of the motor. Once the auxiliary drive is then disengaged, the controller resumes operation of the motor.

The controller may comprise a user console unit, for operation by a user. The controller is arranged in communication with the user console unit by way of a further communications link, such as a serial cable.

This further communications link may provide wireless communication between the controller and the user console unit using a suitable wireless protocol.

The user console unit may include a display, to provide to the user information relating to the operation of the operator unit. This may include drive speed and direction information, and or fault diagnostic data.

The user console unit allows the user to interact with the controller to set and adjust the operational parameters of the operator unit. For example, the user console unit may allow the user to program the end limits of travel of the closure, and to set safety parameters such as the resistance encountered during travel at which closure operation ceases or reverses.

The user console unit and/or the controller may be arranged to interface with a remote control device to allow remote wireless operation of the operator unit.

The integrated controller may include a filter module for suppressing electronic noise signals from affecting the mains supply, as is commonly required for inverter systems.

The inverter and the drive controller may be arranged on a common circuit board fastened to a chassis part of the controller housing.

In another embodiment, the filter, controller and inverter may be arranged on a common circuit board fastened to the chassis part of the controller housing.

The integrated controller preferably includes or is associated with a heat sink assembly arranged in thermal communication with the inverter for dispersing heat away from the inverter driver during operation.

The heat sink assembly may comprise a plurality of planar elongate fins for effecting heat dispersal to the surrounding environment.

The heat sink assembly is arranged to be mounted to the housing of the integrated controller to prevent the ingress of foreign matter such as dust and moisture.

As discussed above, the integrated controller housing may be mounted directly to the motor housing, and this mounting may be configured to afford an operable interconnection between the two to provide a 'plug and play' unit. This arrangement offers convenience to the user, by avoiding the need for the services of a qualified electrician when the unit is installed or removed for repair/maintenance purposes.

This form of the invention may be applicable to controllers of a wide variety of different types, for use in different types of operators, and in this aspect the invention therefore provides an electrical controller for an operator unit having a motor for driving a closure, the controller having a controller housing mountable directly to a housing of the motor.

The controller housing may be fastened to the motor housing by any suitable fastening means.

The controller housing may also comprise a subcompartment allowing access via a removable access cover to a selected portion of the componentry of the controller.

This subcompartment may be arranged to house one or more interface ports used for one or more communications links to the controller.

The subcompartment may be formed by a walled section integrally moulded with the controller housing. The access cover may be removeably fastened in position to the controller housing by way of suitable fasteners engaged therewith. The subcompartment may house at least one fastening means mounting the controller to the motor, so that the two cannot be separated without removal of the subcompartment access cover. Further, the subcompartment may include a sensor activated on removal of the access cover, configured to cut power supply to the controller when the access cover is removed. This may be provided in the form of a microswitch in operative connection with the power supply module. A part of the subcompartment access cover may register with a spring element contacting the microswitch. The supply of power to the controller is restored once the micro-switch registers that the access cover is back in place.

The integrated controller and the motor are arranged for electrical interconnection using a power connection means. This may comprise a plug-and-socket arrangement, with a first connector element provided in the motor housing, and a complimentary second connector element provided in the controller housing.

The second connector element may be arranged to project downwardly (through an aperture formed in a chassis of the controller) from the controller, and the first connector element may be arranged on an upward facing part of the motor housing. The first element may be connector pin plug, and the second element a complementary socket.

The power connection means may be provided with a sealing assembly to address the risk of foreign matter ingression. The sealing assembly may be configured to be positioned between the controller housing and the motor housing when both are brought together. The sealing assembly comprises one or more seal elements and/or a gland body, to surround the power connection means.

The gland body may be provided with shaped recesses to receive respective seal elements. The recesses may be provided in opposite sides of the gland body so that, when the controller housing is placed upon the motor housing, each seal element seats against a respective recess surface.

According to another aspect of the present invention, there is provided a cooling assembly for cooling an inverter of an operator unit according to any one of the embodiments of the first aspect of the present invention described above, the inverter arranged in thermal communication with a heat sink assembly, the cooling assembly arranged so as to be mountable in close proximity to the heat sink assembly so as to drive a flow of air over the heat sink to effect cooling.

The cooling assembly may comprise a fan, mounted to be driven by the motor of the operator unit. Preferably, this comprises fan blades mounted on and rotated by the motor shaft.

The cooling assembly is preferably mounted in close proximity to the controller heat sink assembly, to drive a flow of air over the heat sink to effect cooling.

The fan may be configured to be driven directly by the motor.

The fan may be provided with a fan housing having aperture means such as apertures to allow air to be drawn in by action of the fan blades and passed over the heat sink.

The apertures may be provided in a part of said fan housing at or proximate to an end of said motor shaft.

According to a further aspect of the invention there is provided an operator unit for driving a closure, the operator unit including the above defined integrated controller and a motor. The operator unit may further include an output drive assembly.

BRIEF DESCRIPTION OF THE DRAWINGS

An embodiment of the invention will now be explained, by way of example only, with reference to the accompanying drawings, in which.

DETAILED DESCRIPTION OF THE DRAWINGS

Figure 1A:
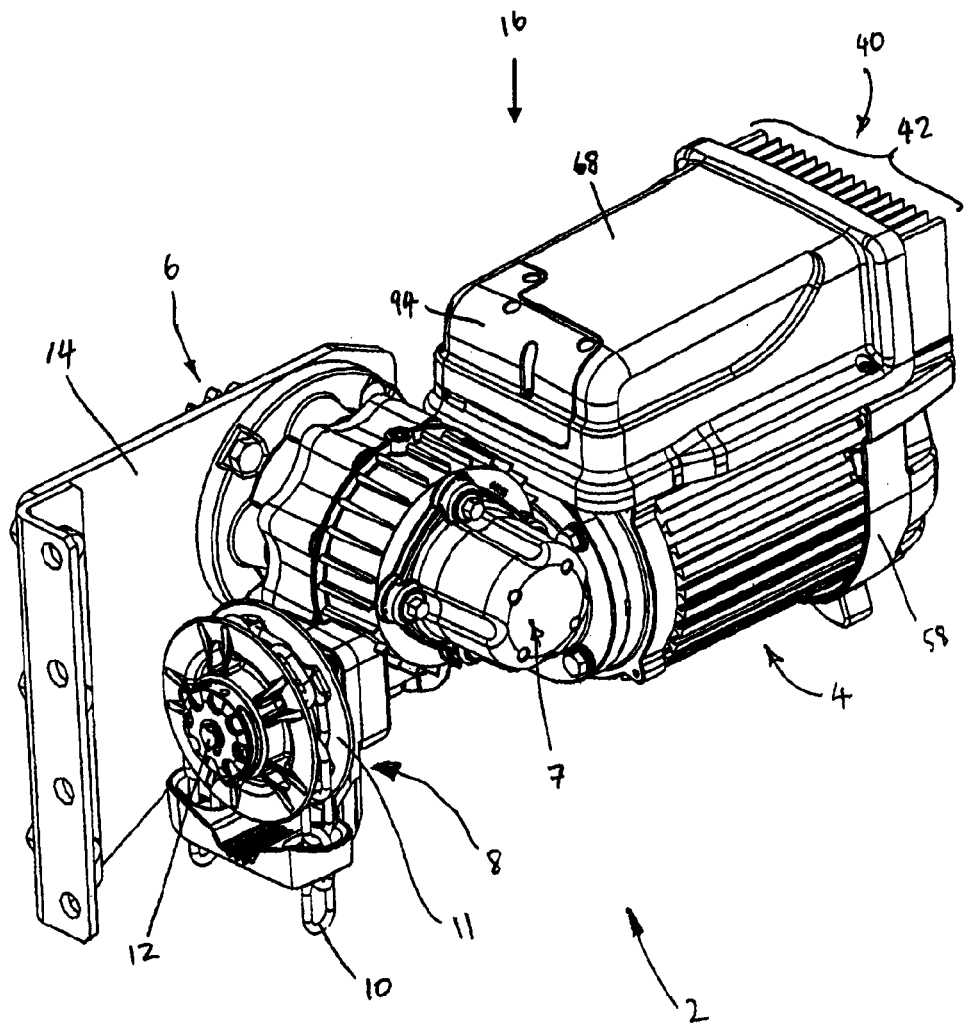
FIG. 1A shows a perspective view of a roller door operator unit having an integrated controller in accordance with the present invention.
Figure 1B:
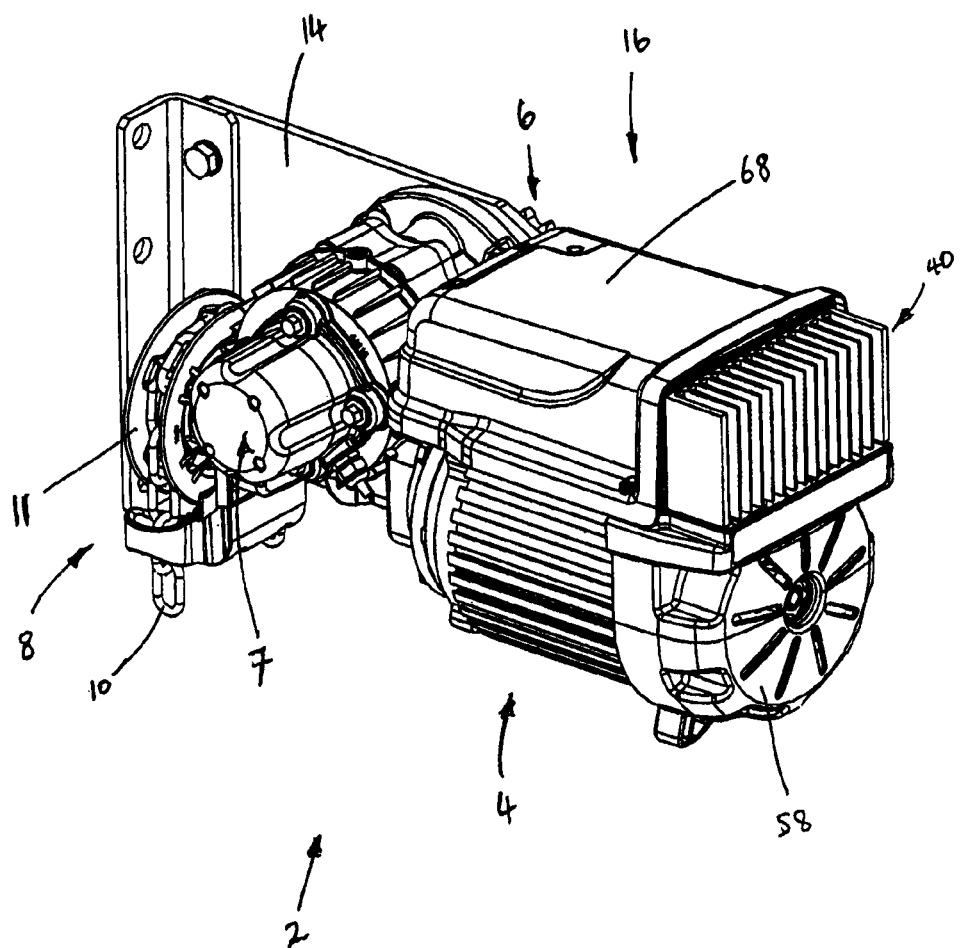
FIG. 1B shows a further perspective view of the roller door operator unit of FIG. 1A.

With reference to FIGS. 1A and 1B, there is shown an operator unit 2 for powering an overhead garage roller door or roller shutter. Operator unit 2 comprises a motor 4, an output drive assembly 6, a timing assembly unit 7, and a clutch assembly 8 for providing selective engagement between motor powered operation and manual operation (provided by a chain 10 rotating a chain wheel 11). Motor 4 is arranged to drive a shaft 12 which, in turn, provides drive to the roller door or shutter assembly (not shown), which includes an axle around which the roller door or shutter is wound. Operator unit 2 is supported in position by a mounting 14. The operator unit 2 further includes an integrated controller 16 for providing power to and control of the operation of the motor 4. The skilled reader will appreciate that the output drive shaft could readily be arranged to operate other types of closures such as chain-driven overhead doors, sliding doors, sectional doors, shutters, gates and the like.

Figure 2A:
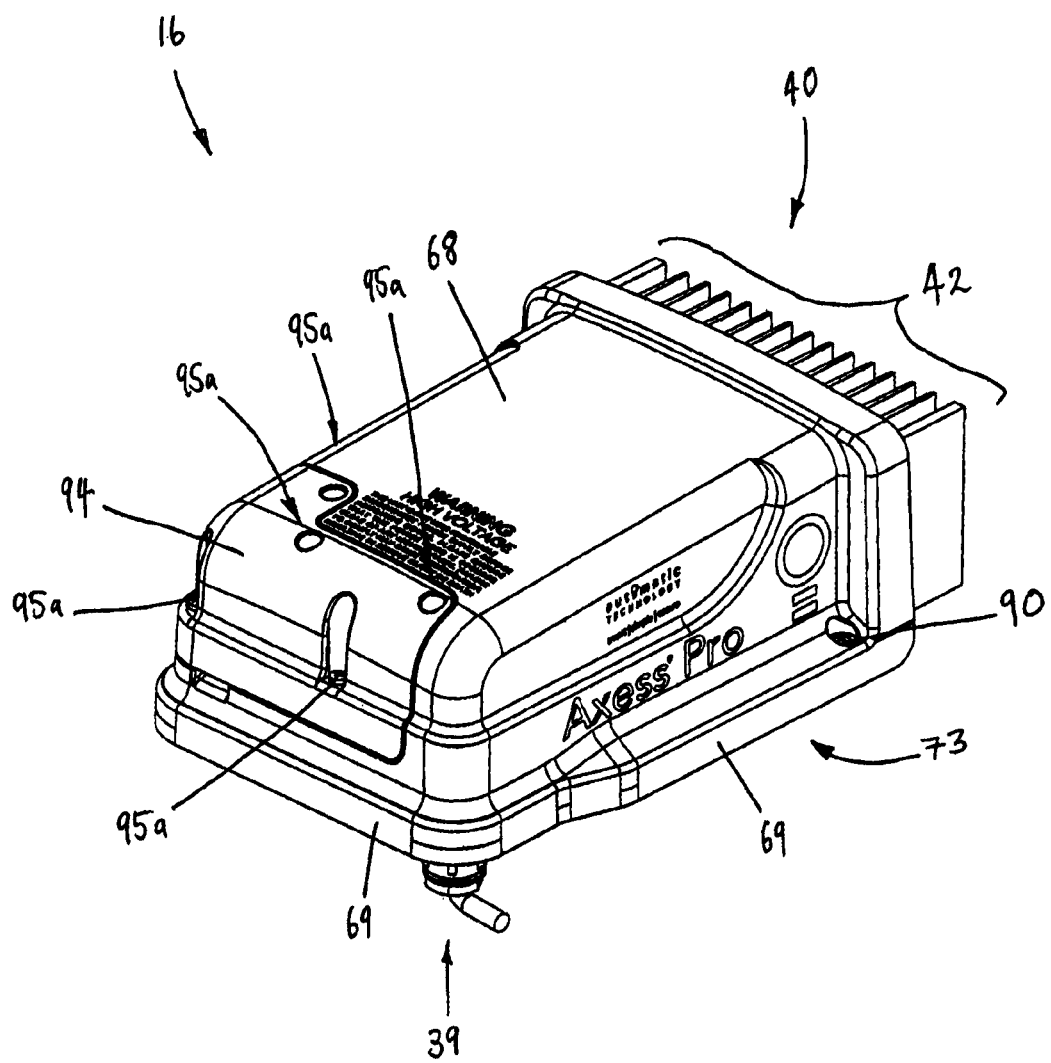
FIG. 2A shows a perspective view of the housing of the controller of FIG. 1A.
Figure 2B:
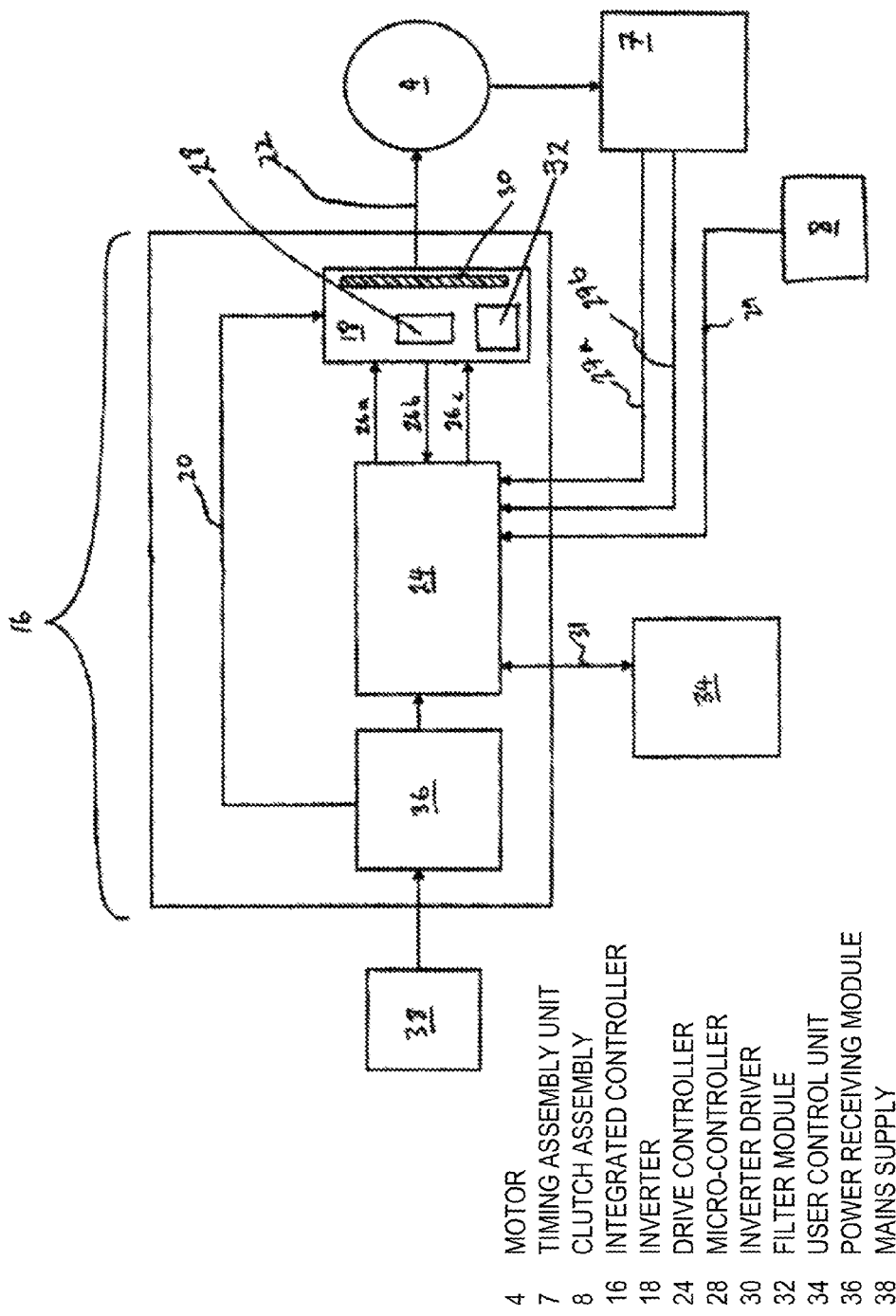
FIG. 2B shows a diagrammatic representation of the functionality of the an integrated controller in accordance with the invention.

The integrated controller 16 of FIGS. 2A and 2B comprises an inverter schematically represented by reference 18, arranged for receiving a high voltage single phase power supply 20 and supplying three phase power 22 to motor 4. Controller 16 further comprises a drive controller 24 arranged in operable association with the inverter 18 for providing active management of the operation of the motor 4. The controller 24 and inverter 18 are configured to function in an integrated manner for providing management of the operation of the motor 4.

The controller 24 and inverter 18 are arranged in communication with one another via a first 26a, a second 26b and a third 26c communications link.

Inverter 18 includes a micro-controller 28 arranged to manage operation of the inverter, and an inverter driver 30 to generate and provide the required three phase waveforms for motor 4 at a required voltage and at a desired frequency between 0-120 Hz.

Inverter micro-controller 28 manages operation of the inverter driver 30, and is further arranged to receive input signals relating to the operation of inverter driver 30, such as, for example, temperature and current/voltage levels, and to provide such information to the controller 24.

The controller 16 is arranged to receive a single phase power supply from the mains supply 38 (through connection means 39) by way of a power receiving module 36. This supplies power to both the controller 24 and the inverter 18. The power receiving module 36 is associated with a filter module 32 for filtering the power supplied to the unit, in order to suppress electronic noise signals which might otherwise feed back into the mains supply, as is common with such devices.

Signal information from the controller 24 to the inverter 18 by way of first communications link 26a comprises instructions for changing operational parameters (speed and the direction of motor 4). Signal information from the inverter 18 to the controller 24 by way of second communications link 26b comprises status information relating to the operational performance of the inverter, which is monitored by the control module 24.

The controller 24 is configured to maintain (by way of an internal memory storage means) a history of the last 64 operational events, being open/close cycles of the closure and the faults (and types of those faults) that have occurred during operation. It will appreciated that the amount of information that can be stored will be dependent on the memory capacity of the controller 24. In addition, the controller 24 may be configured to maintain a record of the number of instances a particular type of fault occurs.

Once a fault is detected, the controller 24 may initiate a fault state which remains effective until the user acknowledges the fault by, for example, pressing a button on the user console unit (see below), or switching the controller power off and on.

The controller 24 may be arranged so that, if a fault occurs in the inverter 18, the status information provides diagnostic information on the status of the inverter 18 and the time the fault occurred (by way of a time stamp utility), to further afford active performance management of the operation of the inverter 18. The status information may include, for example, the following operational parameters:
the level of supply voltage at the time fault occurred;
the level of current at the time fault occurred;
the motor drive current limit;
the motor drive current level;
Insulated Gate Bipolar Transistor (IGBT) driver temperature at fault;
IGBT driver fault.

Third communications link 26c is provided for override instruction signals from the controller 24 to the inverter 18, in the event a fault is detected. For example, if the controller detects that the operating temperature of the inverter driver 30 is too high, it ceases operation of motor 4. Such instructions may operate to directly instruct the inverter driver 30, overriding the inverter micro-controller 28. Further, the controller 24 is programmed in such a way that if a disparity is detected between the output of inverter 18 and commands issued by the controller (for example, the status does not correspond to the speed and direction instructions), the override is used to discontinue operation of the inverter driver.

As a further failsafe measure, controller 24 is programmed to instruct inverter 18 to cease operation of the motor in the event communication of the first 26a or second 26b communications links is lost.

The controller 16 is programmed so that, in the event a fault occurs with the inverter 18 and motor 4 is shut down, operation can be readily recovered by an operator, without the user having to disconnect power to the controller 16 (see below for further discussion of the user console).

A further communications link means 27a,b is provided between timing assembly unit 7 and controller 24. Timing assembly unit 7 is arranged to monitor rotation of the output drive assembly 6. The timing assembly 7 comprises an absolute position encoder (not shown) arranged to detect the absolute position of the closure at any point in the movement cycle—between preset limit points corresponding to the full range of travel of the closure. The transfer of signal information from timing assembly unit 7 is coordinated by the controller 24. The absolute position encoder provides the signal information for transfer to controller 24 to enable the latter to continuously monitor position (27a) and speed (27b) of the closure. It will be appreciated that the speed information is calculated in real time from the position information provided by the position encoder, and this calculation can be done by timing assembly unit 7 or by controller 24.

A further communications link 29 between clutch assembly 8 and controller 24 provides a signal in response to engagement of an auxiliary drive (such as a manually-driven chain wheel 11) with drive shaft 12. The clutch assembly 8 includes a micro-switch (not shown) arranged to detect engagement of the chain wheel 11 with shaft 12. Controller 24 is programmed to override operational commands to cease operation of motor 4 when the auxiliary drive has been engaged, and to resume normal operation once the auxiliary drive is disengaged.

The controller 24 is arranged in communication with a user control unit 34 by way of a further communications link 31 (a serial cable or the like) for operation by a user. The user control unit 34 is installed at a location readily accessible to the user. Communications link 31 may be a wireless link, using any appropriate wireless protocol.

The user control unit 34 allows the user to selectively access and display (via an LCD display or similar) information relating to the operation of operator unit 2. Unit 34 may display fault diagnostic data provided when a fault occurs, allowing the user to determine the nature of the fault and to take the necessary steps to resume operation. It will be appreciated that such information may be accessed, displayed and stored using any suitably appropriate functionality, such as by way of a menu-based format. For example, user control unit 34 may be arranged so that the load profile of the operator unit 2 over its range of travel is graphically presented on the LCD display during operation, eg as a bar graph or similar.

As mentioned above, the user control unit 34 allows a user (once fault diagnosis information has been assessed) to reset the controller without the need to disconnect power from the operator unit, which is conventionally required for closure operators with fault shutdown functionality. Under instruction from the user, controller 24 is programmed to issue the appropriate operational commands to resume operation, in accordance with prescribed criteria.

The user control unit 34 allows the user to interact with the controller 24 to set and adjust the operational parameters of the operator unit 2. For example, unit 34 may be configured to allow the user to set the speed of the closure, or to program the limits of travel of the closure.

Controller 24 is programmed to cease operation of the motor in the event that communication from the user control unit 34 by communications link 31 is lost.

User control unit 34 or controller 24 may be arranged to communicate with a remote control device (not shown) for operation by the user.

Subsequent firmware revisions may be installed in the controller 24 by way of the user control unit 34. Current systems require a handheld programmer device to be plugged directly into the controller circuitry—which may be installed well above ground level. In the present invention, firmware for the controller 24 may be installed (eg. during servicing of the operator unit) by plugging the programmer device being plugged into the user control unit 34, which is installed at a position readily accessible from ground level. This has the effect of placing unit 34 in a 'pass-through' mode to relay instructions to the controller 24 via the interface to the controller.

Figure 3A:
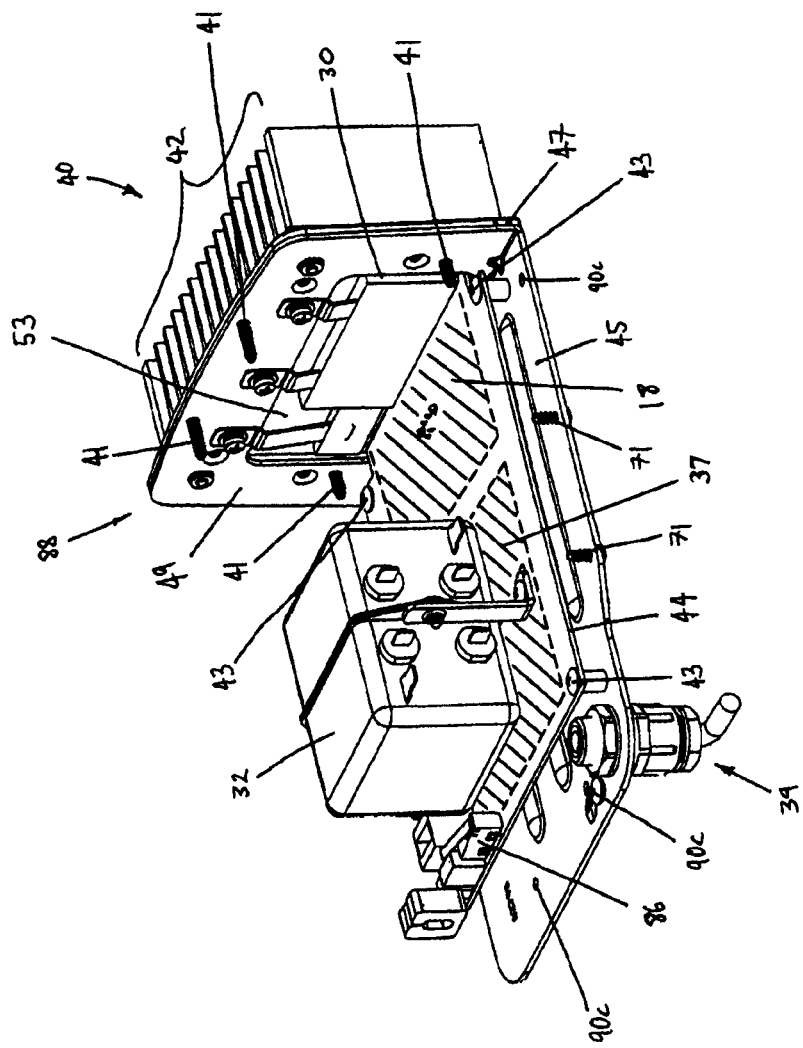
FIG. 3A shows a perspective view of the controller of FIGS. 1A and 1B with the controller housing removed.
Figure 3B:
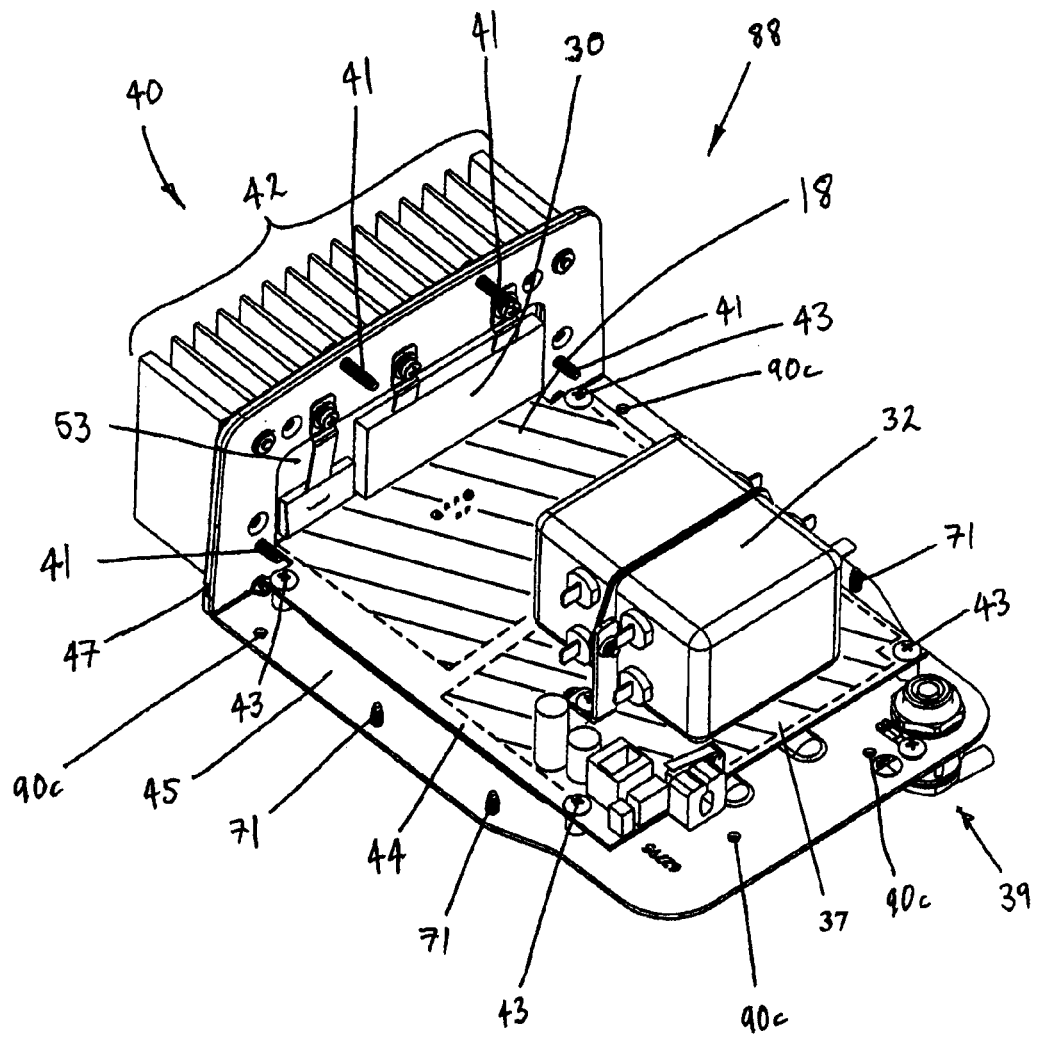
FIG. 3B shows a further perspective view of the controller of FIG. 3A.
Figure 3C:
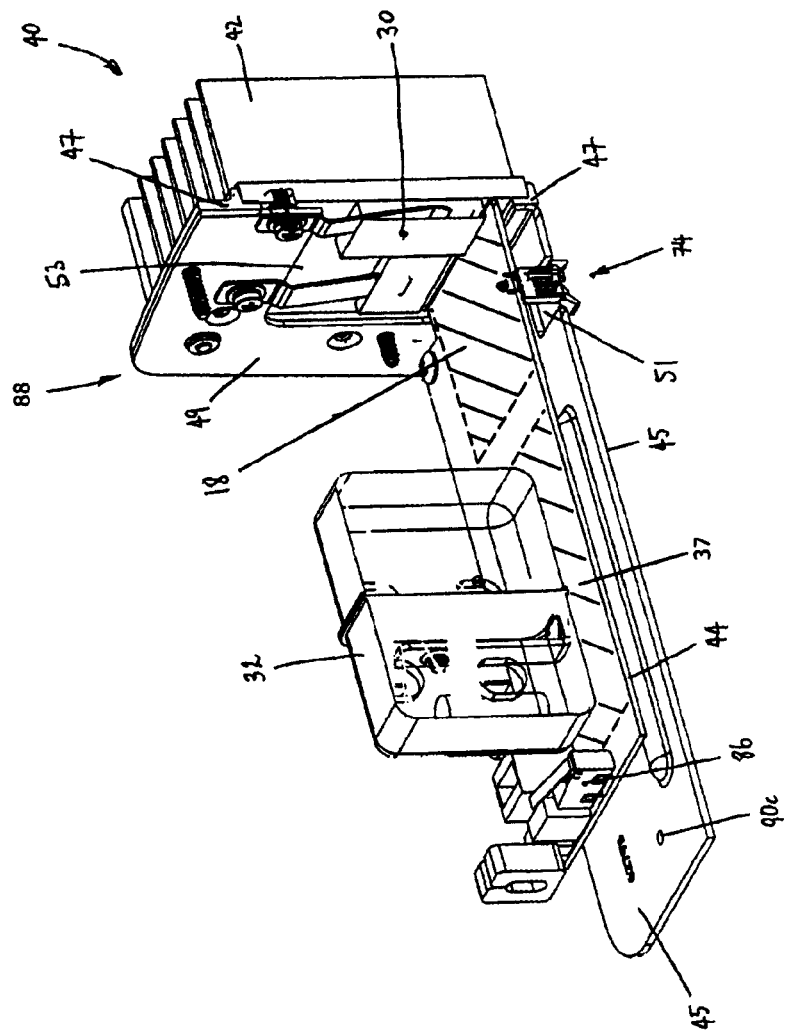
FIG. 3C is a perspective view of a cutaway section of the controller of FIG. 3A, sectioned along the longitudinal centre of the chassis.

With reference to FIGS. 3A, 3B and 3C, the circuitry (schematically represented by reference 37) of controller 24 and inverter circuitry 18 are arranged on a common circuit board 44 which is fastened to a chassis 45 by screws 43. The circuit board 44 thus comprises all the circuitry for both the controller and the inverter, but their respective circuits are isolated from each other on different regions of circuit board 44.

Figure 4:
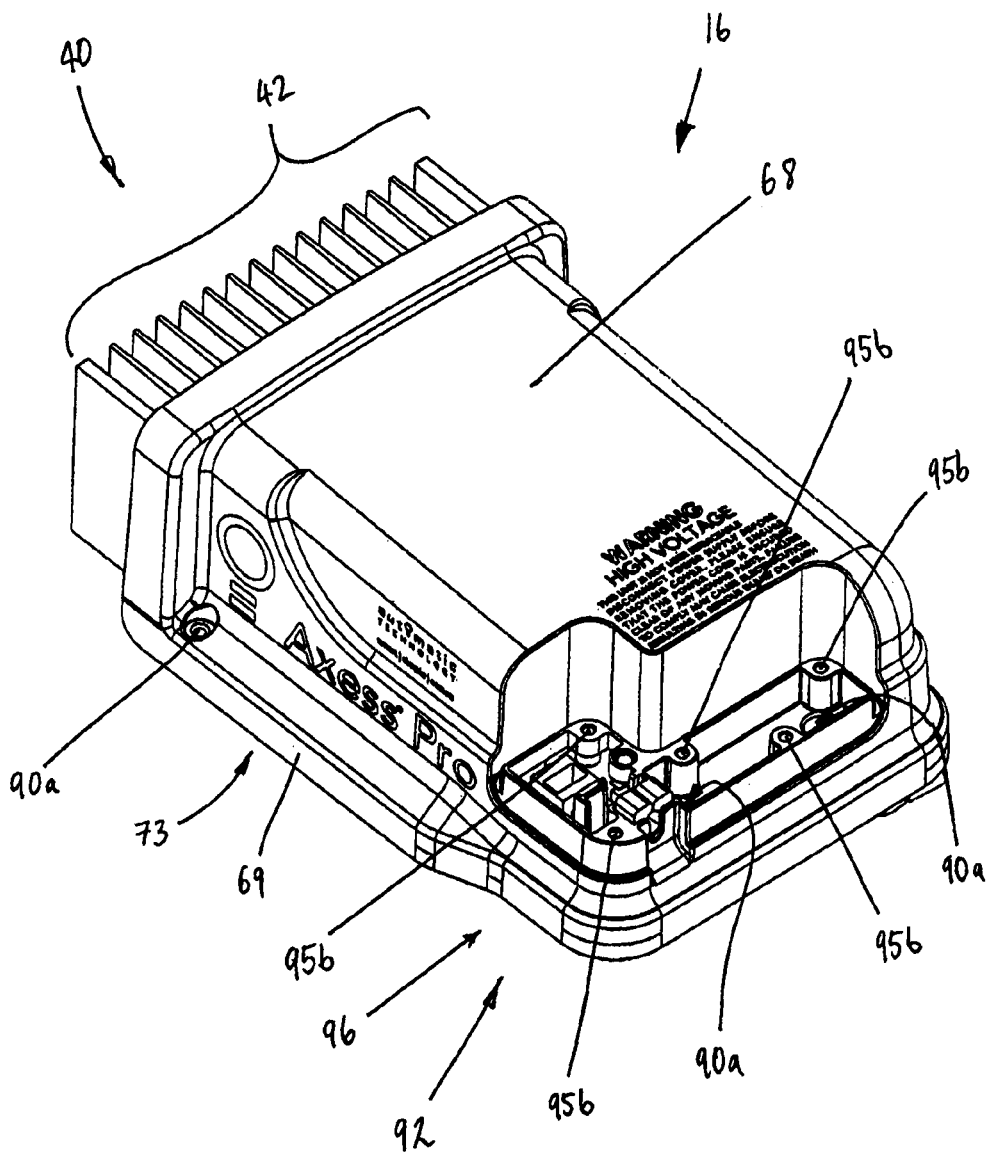
FIG. 4 shows a further perspective view of the controller of FIG. 2A, with the access panel removed.

With reference to FIG. 4, integrated controller 16 comprises a housing 68 to house all the componentry, so that it can be provided as a modular unit for attachment to operator unit 2. Controller housing 68 provides a shield for preventing foreign matter (in particular, dust and moisture) from reaching the interior. Chassis 45 is arranged to be removably fastened to controller housing 68 by screws 71 (shown in FIGS. 3A and 3B) which screw into respective holes (not shown) provided in the underside of a peripheral skirt 69 of the housing 68.

Figure 7A:
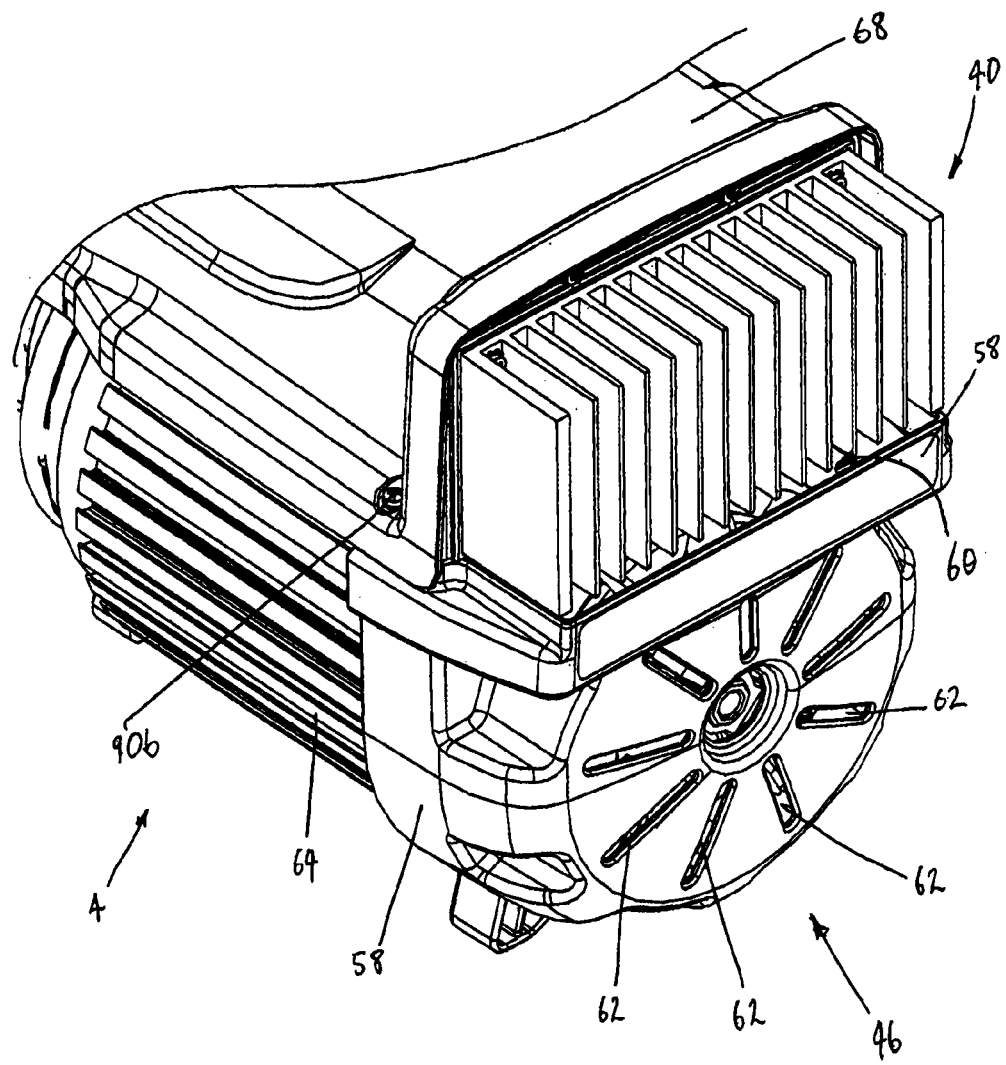
FIG. 7A shows a close-up perspective view of the fan and heat sink assemblies of the controller of FIG. 1B.

Controller housing 68 features a fastening arrangement 90 for removable attachment to operator unit 2. As shown in FIGS. 4 and 7A, controller housing 68 features four holes 90a through which respective bolts 90b are inserted. Bolts 90b are inserted within respective holes (not shown) formed in a housing of a cooling assembly 46 (see below) and fastened with respective nuts (not shown). Bolts 90b (as shown in FIG. 7A) also pass through holes 90c (see FIGS. 3A, 3B and 3C) in chassis 45. The skilled reader will appreciate that many other fastening arrangements known in the art may be employed to fasten controller housing 68 in position.

The controller housing 68 also comprises a subcompartment 92 to allow access—via a removable access cover 94 (see FIGS. 1A and 2A)—to be gained to a portion of circuit board 44. Subcompartment 92 provides access to interface ports 96 to receive respective connectors for inputs such as the micro-switch harness connecting to clutch assembly 8, the harness connecting to timing assembly 7, and the RS485 serial cable connecting to user control unit 34. Subcompartment 92 is defined by walled sections integrally moulded into the controller housing 68. Access cover 94 is removeably fastened in position to the controller housing 68 using five screws 95a (FIG. 2A) in respective threaded holes 95b provided in the moulded surrounds as shown. This allows the access cover 94 to be removed while the controller housing 68 remains in place on the operator unit, but prevents access to the remainder of the integrated controller. It will be appreciated that some of the bolts which attach controller housing 68 to the operator unit can only be accessed by way of subcompartment 92.

Integrated controller 16 further comprises a heat sink assembly 40 arranged in thermal communication with inverter driver 30 for dispersing heat away from the inverter during operation. As shown in FIGS. 3A, 3B and 3C, heat sink assembly 40 is arranged at one end 88 of the controller housing 68, in close proximity to inverter driver 30. Heat sink assembly 40 comprises a plurality of planar elongate fins 42 for effecting heat dispersal to the surrounding environment.

Heat sink assembly 40 is attached to the outer face of a flange 49 upstanding from chassis 45 by way of screws 41. Flange 49 features an aperture 53 to afford direct thermal communication of the inverter driver 30 to heat sink assembly 40. A gasket 47 is clamped between flange 49 and heat sink assembly 40 to prevent ingress of foreign matter which might otherwise enter interior of housing 68 by way of aperture 53.

A connecting assembly 74 provides electrical connection between controller 16 and motor 4. When engaged, connecting assembly 74 establishes electrical contact between the motor 4 and the circuitry of inverter 18. The connecting assembly 74 comprises a plug-and-socket arrangement comprising a four pin connector plug 76 in the motor housing 64 and a complimentary connector socket 78 in integrated controller 16, the two releasably interengaging when the controller 16 is placed in position on motor housing 64 (see FIGS. 3C, 5A and 5B). As shown in the figures, controller 16 is arranged for mounting on top of motor housing 64 (with the operator unit 2 in its installed position).

Connector socket 78 projects downwardly from circuit board 44 through an aperture 51 formed in chassis 45 so as to receive connector plug 76. Connector plug 76 projects upwardly from the motor housing 64.

Figure 5A:
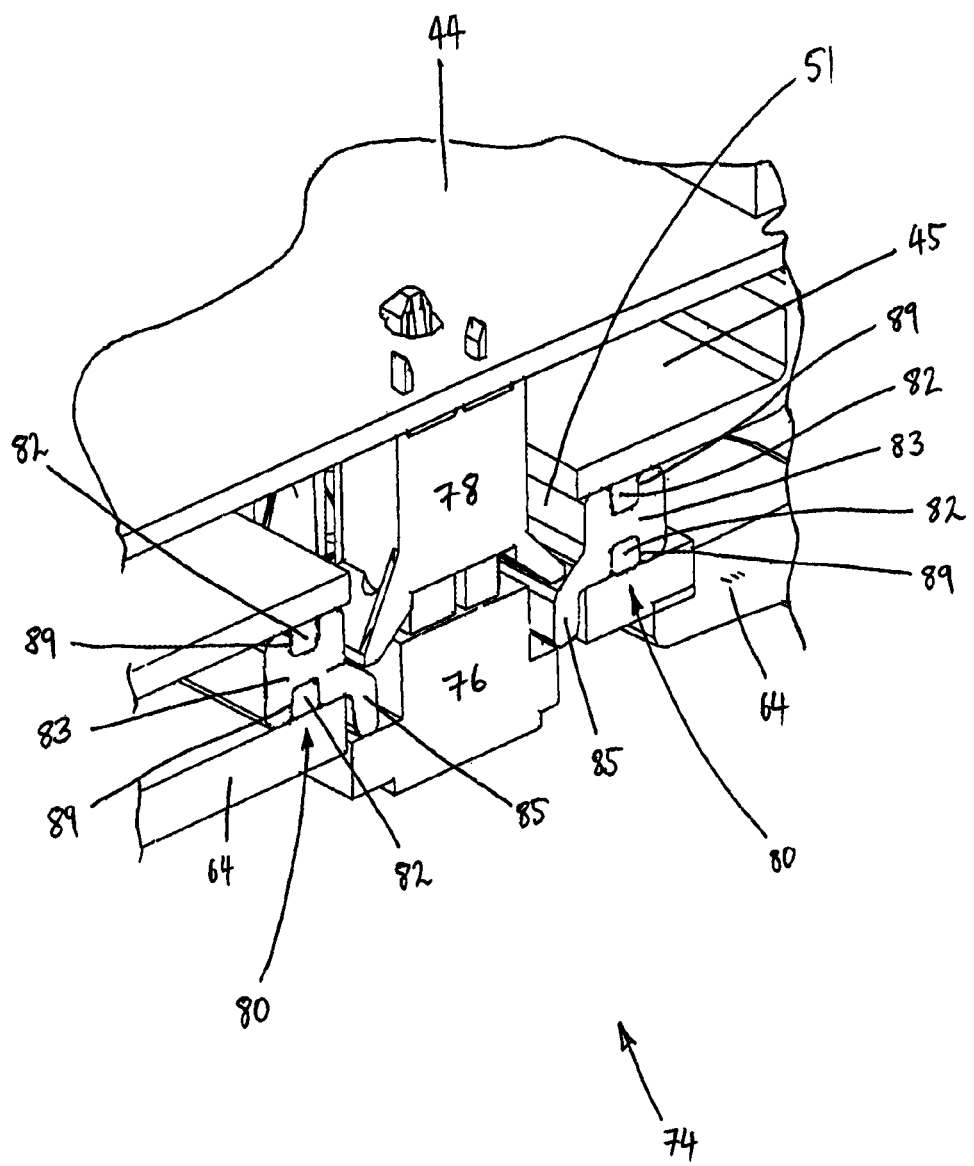
FIG. 5A shows a perspective cutaway view of the connecting assembly of the controller of FIG. 2A, when sectioned along the centre longitudinal axis.
Figure 5B:
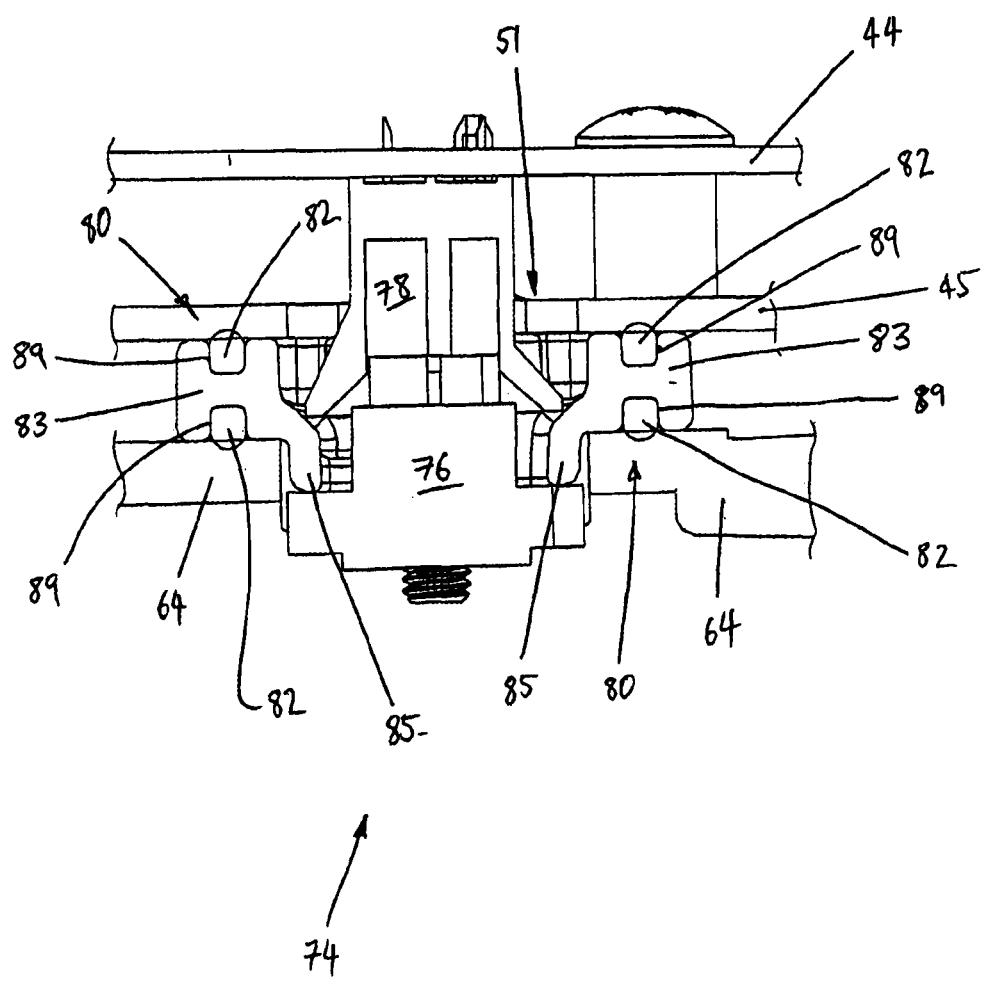
FIG. 5B shows a cross sectional view of the connecting assembly of FIG. 5A.

With specific reference to FIGS. 5A and 5B, connecting assembly 74 is provided with sealing means 80—configured to be positioned between the chassis 45 and the motor housing 64 when both are brought together—to prevent ingress of foreign matter to the electrical contacts. As shown, sealing assembly 80 comprises seal elements 82 such as rubber 'o' rings arranged mounted in recesses 89 on upper an lower surfaces of a gland body 83 shaped to surround the aperture 51. When the integrated controller is fastened to the motor housing, each seal element 82 compresses against its respective adjacent surface to provide the required seal. The gland body 83 further comprises a downwardly-directed peripheral skirt 85 to surround the electrical contacts of the connecting assembly.

Figure 6:
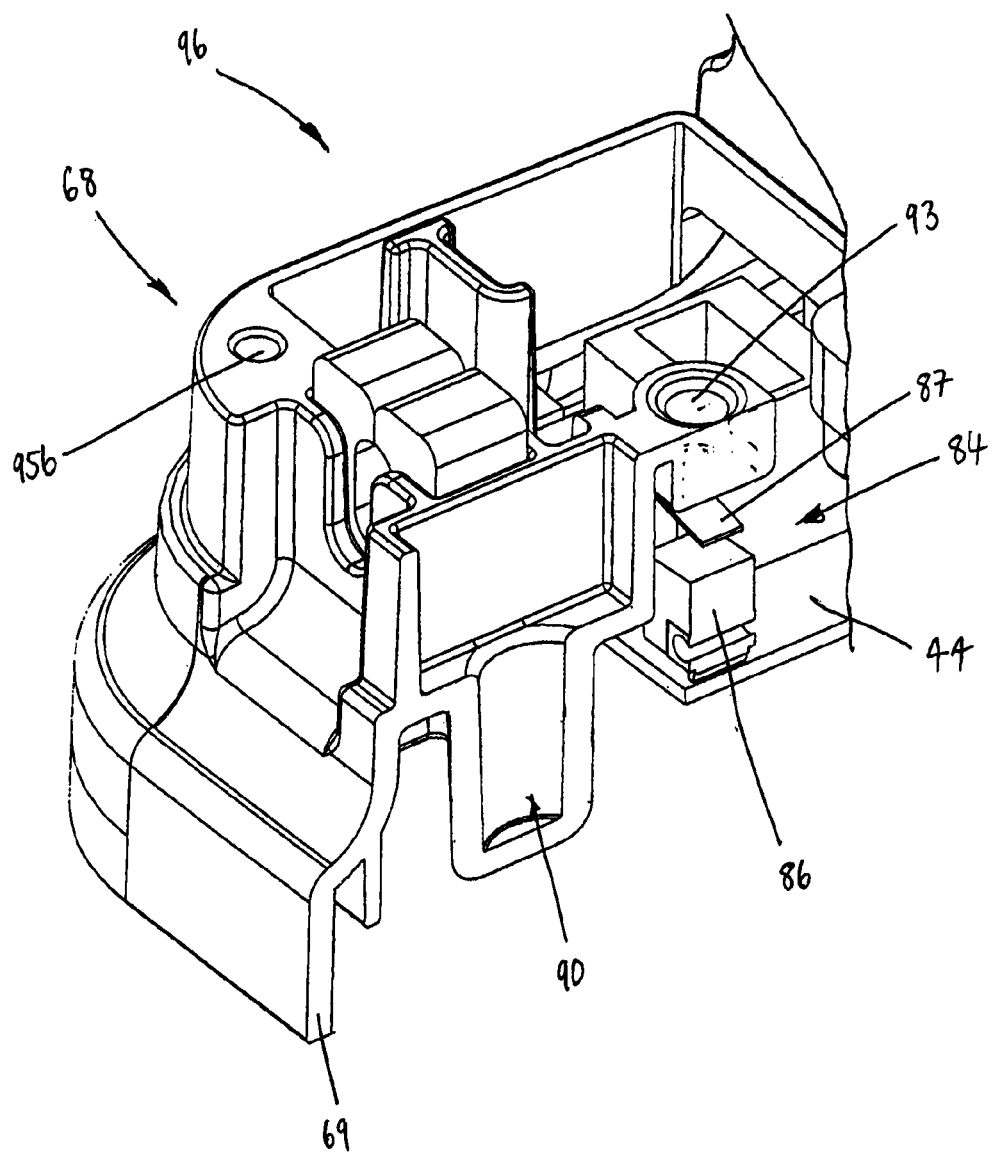
FIG. 6 shows a perspective cutaway view of a portion of the controller of FIG. 2A.

When the integrated controller 16 is to be removed from the operator unit 2, the access cover 94 must first be removed by removing screws 95a. With particular reference to FIG. 6, controller 16 includes a sensing assembly 84 arranged to register the presence of access cover 94, to interrupt the power supply to the controller when the cover is removed. The sensing assembly 84 comprises a micro-switch 86 in electrical communication with the power receiving module 36 of the controller 16. Micro-switch 86 is operatively associated with a leaf spring member 87 arranged to be engaged by a projection (not shown) extending from the underside of access cover 94. When the access cover 94 is placed in position on controller housing 68, the projection locates within aperture 93 and depresses leaf spring member 87, activating micro-switch 86, which then permits mains power to be supplied to power receiving module 36. When housing 68 is removed, the power supply is cut off from certain parts of the controller circuitry in order to reduce the risk of persons coming into contact with high voltages. The interior of subcompartment 92 cannot therefore be accessed without suppressing the power supply to the controller circuitry, and without accessing the interior of subcompartment 92 electrical interface ports 96 cannot be accessed, and the bolts fastening the controller housing 68 to the operator unit 2 cannot be removed. This provides a failsafe design ensuring that the integrated controller cannot be accessed or removed without suppressing potentially dangerous power supply.

This arrangement enables controller 16 to be provided as a 'plug-and-play' unit, avoiding the need for the services of a qualified electrician for installation and removal of the unit. Like controllers 16 are readily interchangeable with other like operator units 2 if required.

Figure 7B:
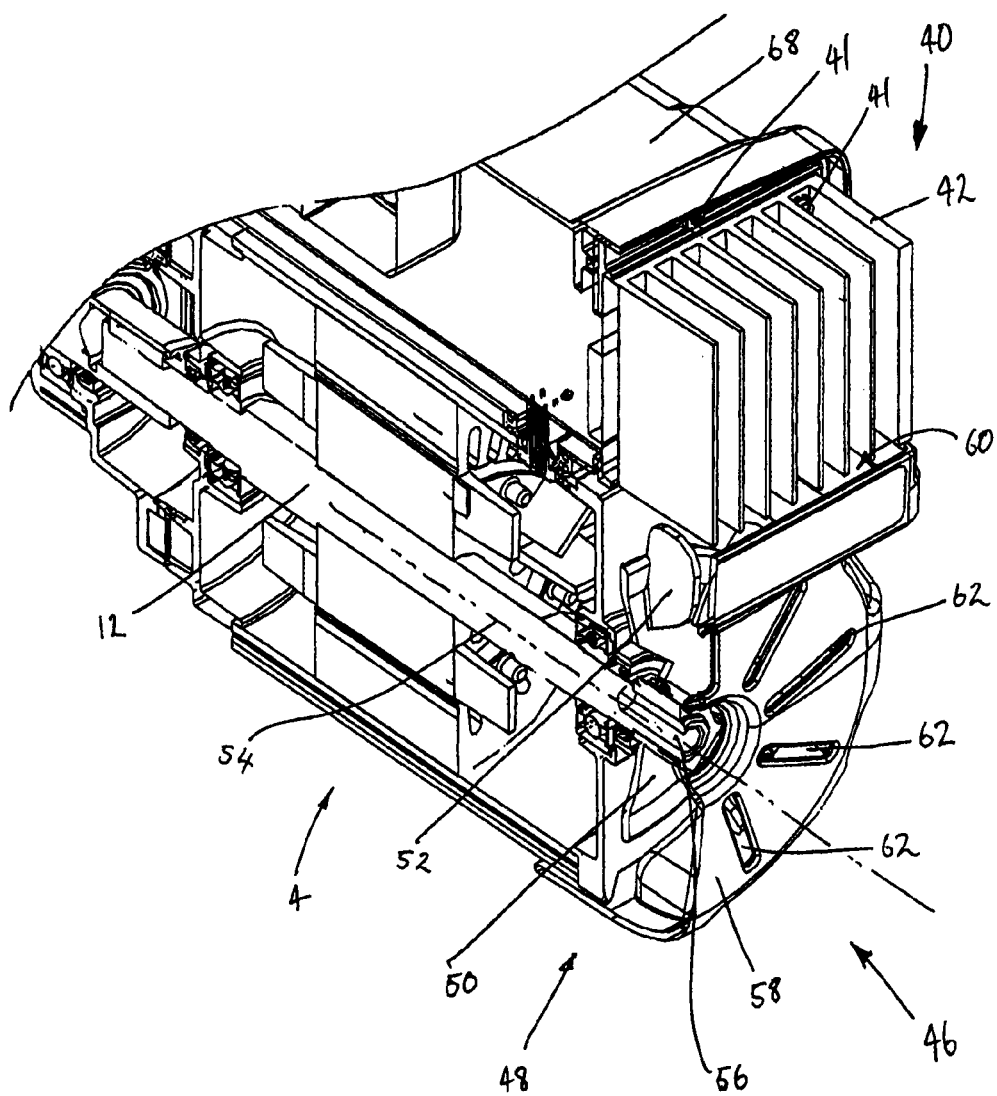
FIG. 7B shows a perspective cutaway view of the assemblies of FIG. 7A, sectioned along the axis of the drive shaft.

With reference to FIGS. 7A and 7B, the controller 16 further includes a cooling assembly 46 comprising a fan assembly 48 which includes a fan 50 for cooling inverter driver 30. The fan 50 is arranged to be driven by motor 4 and comprises a plurality of blades 52 equi-spaced around a hub splined to motor drive shaft 12. As shown, cooling assembly 46 is provided in close proximity to and directly below the controller heat sink assembly 40, so that operation of the fan 50 drives a flow of air over the heat sink fins 42 to effect cooling.

Fan assembly 48 comprises a fan housing 58 enclosing fan 50, the fan housing removably fastened to motor housing 64, and comprising a plurality of air inlet holes 62 in an axial face, and outlet vent hole 60 through which air driven by the blades is directed to the fins of heat sink assembly 40.

It will be appreciated that heat sink fins 42 extend across substantially the entire width of controller housing 68 to maximise the cooling effect. The diameter of fan blades 52 is of a similar dimension.

With the cooling arrangement illustrated and described above, the inventors have determined that the controller is operable in an ambient temperature of up to around 55 degrees celsius.

The housings of the various assemblies discussed above are formed from a suitably durable plastic material capable of injection moulding or similar manufacturing processes. The heat sink assembly is constructed of suitable metallic material having a high co-efficient of thermal conduction. All gaskets, glands and sealing components comprise a suitable resilient material such as rubber.

In particular, cover seals for the integrated controller 16 may comprise Santoprene™ 111-45, and the materials used for shielding electrical wire, joints and/or connectors may comprise ethylene vinyl acetate (EVA) or similar closed cell foam materials.

The word 'comprising' and forms of the word 'comprising' as used in this description and in the claims do not limit the invention claimed to exclude any variants or additions. Modifications and improvements to the invention will be readily apparent to those skilled in the art. Such modifications and improvements are intended to be within the scope of this invention.

The claims defining the invention are as follows:

1. An integrated controller for an operator unit having a three phase motor for driving a closure, the integrated controller comprising:
    a drive controller for providing active management of operation of the motor to control operation of the closure; and
    an inverter in operable association with the drive controller, the inverter arranged for receiving a single phase power supply and supplying three phase power to drive the motor, the inverter including an inverter micro-controller programmed to manage operation of the inverter and an inverter driver, the inverter micro-controller being operably interconnected with the inverter driver to generate three-phase waveforms for supply to the motor, and the inverter micro-controller arranged to receive input signal information relating to the operation and performance of the inverter driver and to communicate such information to the drive controller so to allow said active management of the operation of the motor based on the operation and performance of the inverter driver.

2. The integrated controller according to claim 1, wherein the inverter and the drive controller are arranged to be controlled by a single integrated micro-controller.

3. The integrated controller according to claim 1, wherein the inverter and the drive controller are arranged on a common circuit board.

4. The integrated controller according to claim 1, wherein said information relates to at least one of temperature, current level, and voltage level.

5. The integrated controller according to claim 1, further comprising an electrical power supply module arranged to supply power to both the drive controller and the inverter driver.

6. The integrated controller according to claim 1, further comprising a first communication link between the controller and inverter to allow first signal information to be sent to the inverter from the controller, the first signal information comprising operation instructions for operation of the motor.

7. The integrated controller according to claim 6, further comprising a second communication link between the controller and the inverter to allow second signal information to be sent from the inverter to the controller, the second signal information comprising status information relating to inverter performance.

8. The integrated controller according to claim 7, wherein status information relating to inverter performance faults comprises diagnostic information specifying status of the inverter at a time a fault occurred, said diagnostic information including at least one of the following:
    (i) a level of supply voltage at the time the fault occurred;
    (ii) a level of current at the time the fault occurred;
    (iii) a motor drive current limit;
    (iv) a motor drive current level;
    (v) an Insulated Gate Bipolar Transistor (IGBT) driver temperature at fault; and
    (vi) identification of an IGBT driver fault.

9. The integrated controller according claim 7, including a third communications link between the controller and the inverter, to allow third signal information to be sent to the inverter from the controller, the third signal information comprising override instructions to allow the controller to override existing operational commands previously sent to the inverter.

10. The integrated controller according to claim 9, said third communication link configured to allow the controller to provide override instructions directly to the inverter driver to cease operation of the motor.

11. The integrated controller according to claim 9, wherein the controller is configured to instruct the inverter, by way of the third communications link, to cease operation in the event that one of the first and second communication links is lost.

12. The integrated controller according claim 7, wherein the communication between the controller and inverter is arranged so that, in the event of a fault and the motor operation ceasing, operation of the inverter can be recovered without terminating operation of the controller.

13. The integrated controller according claim 7, comprising a position communications link between a position sensor and the controller, the position sensor arranged so as to monitor movement of an output of the operator unit for continually providing information regarding a position of the closure.

14. The integrated controller according to claim 7, wherein the operator unit comprises a clutch assembly for selectively engaging a drive between an auxiliary drive and the closure, the controller including an auxiliary drive communications link between said clutch assembly and the controller for signaling whether or not said auxiliary drive has been engaged to drive the closure.

15. The integrated controller according to claim 1, further comprising a heat sink assembly arranged in thermal communication with the inverter for dispersing heat away from the inverter driver during operation.

16. The integrated controller according to claim 1, wherein the controller is configured so as to store a history of events relating to the operation of the operator unit.

17. The integrated controller according to claim 16, wherein the events include at least one open/close cycle of the closure, and any faults that occur during operation of the operator unit.

18. The integrated controller according to claim 1, wherein the controller is configured so as to provide information to an operator in the event a fault occurs, and to receive reset instructions from the operator to selectively reset the operation of the operator unit.

19. The integrated controller according to claim 1, wherein the inverter and the drive controller are provided within a common controller housing.

20. The integrated controller according to claim 19, wherein the controller housing is arranged so as to be mountable directly to a housing of the motor.

21. The integrated controller according to claim 20, wherein the controller housing is arranged so that it cannot be removed from the motor housing without interrupting a power supply to the integrated controller.

22. The integrated controller according to claim 20, wherein the controller housing comprises a subcompartment allowing access via a removable access cover to a selected portion of the componentry of the controller, the subcompartment including a sensor activated on removal of the access cover, and configured to cut power supply to the controller when the access cover is removed.

23. The integrated controller according to claim 22, wherein a part of the access cover is arranged to operate a switch.

24. The integrated controller according to claim 23, wherein said part of the access cover is arranged to register with a spring element contacting the switch.

25. The integrated controller according to claim 23, configured such that a supply of power to the controller is restored once the switch registers that the access cover is back in place.

26. The integrated controller according to claim 20, wherein the integrated controller and the motor are arranged for electrical interconnection using a power connection means, the power connection means comprising a first connector element provided in the motor housing, and a complimentary second connector element provided in the controller housing.

27. The integrated controller according to claim 26, wherein the second connector element is arranged to project downwardly from the controller, and the first connector element arranged on an upward facing part of the motor housing.

28. The integrated controller according to claim 26, wherein the power connection means is provided with a sealing assembly to protect against ingression of foreign matter, the sealing assembly positioned between the controller housing and the motor housing when both are brought together.

29. The integrated controller according to claim 28, wherein the sealing assembly comprises one or more seal elements surrounding the power connection means, such that interconnecting the controller housing and the motor housing results in substantially sealing the power connection means from the environment.

30. An operator unit for driving a closure, the operator unit comprising an integrated controller as defined in claim 1.

31. An operator unit for driving a closure, the operator unit comprising:
a motor for driving a motor shaft arranged to drive the closure;
an inverter arranged to supply electrical power to the motor;
a heat sink assembly arranged to remove heat from the inverter; and
a cooling assembly including a fan comprising fan blades mounted on and rotated by said motor shaft,
wherein the cooling assembly and the heat sink assembly are mounted in proximity to one another at or near one end of the motor, the fan blades providing a flow of air to effect cooling of the heat sink assembly.

32. The operator unit according to claim 31, including a fan housing having apertures to allow air to be drawn in by action of the fan blades and passed over the heat sink.

33. The operator unit according to claim 32, wherein said apertures are provided in a part of said fan housing at or proximate to an end of said motor shaft.

34. The operator unit according to claim 31, further comprising an integrated controller comprising:
a drive controller for providing active management of the operation of the motor to control operation of the closure; and
an inverter in operable association with the drive controller, the inverter arranged for receiving a single phase power supply and supplying three phase power to drive the motor, the inverter including an inverter microcontroller programmed to manage operation of the inverter and an inverter driver, the inverter microcontroller being operably interconnected with the inverter driver to generate three-phase waveforms for supply to the motor, and the inverter micro-controller arranged to receive input signal information relating to the operation and performance of the inverter driver and to communicate such information to the drive controller so to allow said active management of the operation of the motor.

* * * * *